United States Patent Office 3,069,069
Patented Dec. 18, 1962

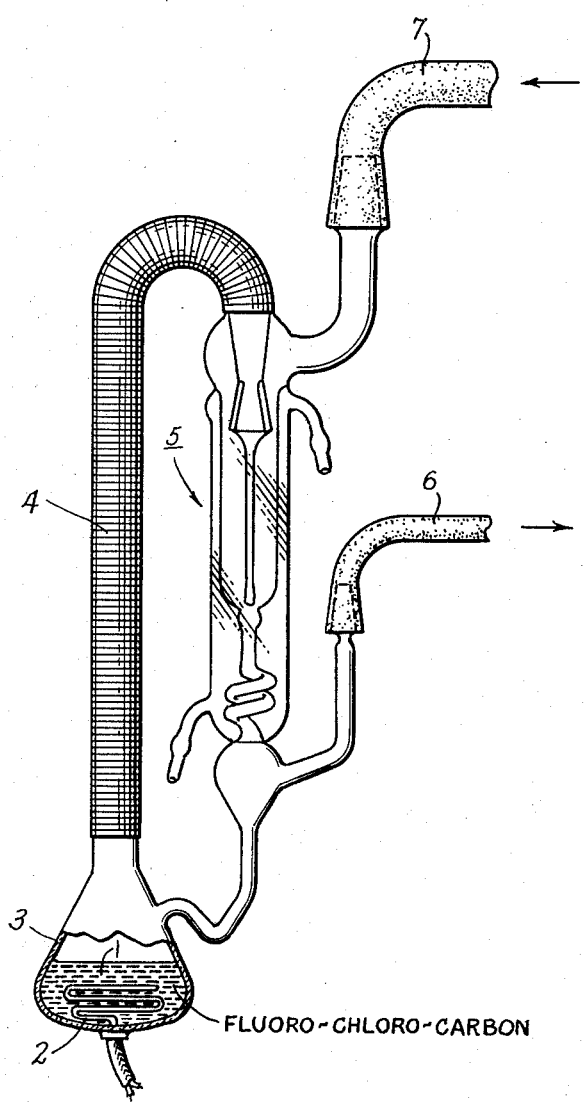

3,069,069
ACTUATING FLUID FOR USE IN VACUUM PUMPS
Edgar Fischer, Frankfurt am Main, Germany, assignor to Farbwerke Hoechst Aktiengesellschaft vormals Meister Lucius & Bruning, Frankfurt, Germany, a corporation of Germany
Filed Oct. 27, 1958, Ser. No. 769,530
Claims priority, application Germany Nov. 2, 1957
2 Claims. (Cl. 230—101)

Standard steam ejectors and diffusion pumps are operated with either metallic mercury or oils of organic nature as actuating fluid.

Metallic mercury evolves however rather toxic vapors and involves further disadvantages so that it has been substantially replaced by actuating fluids of organic nature, or more especially esters of phthalic acid, sebacic acid, phosphoric acid and, furthermore, suitable hydrocarbons and also chlorinated hydrocarbons and silicon oils. Actuating fluids which consist of esters are distinguished by a very good thermal stability; on the other hand, they involve the disadvantage of being readily attacked by chemical agents and more especially by oxidizing or hydrolyzing agents. Oxygen or oxygen-containing gases as well as free halogens and hydrogen halides, for example, make the aforesaid actuating fluids rapidly useless so that the pumps must be thoroughly cleansed and filled with a fresh amount of actuating fluid necessary for operation.

Hydrocarbon oils possess a good thermal stability, are somewhat more resistant against chemical agents, for example hydrogen halides, but they are as readily attacked by free halogen and oxidizing gas as are the aforesaid esters which are used as actuating fluids.

An advance in this field was achieved with the introduction of silicon oils as actuating fluids which have an improved thermal and a very good chemical stability. They are, for example, substantially insensitive to oxidizing influences, but nevertheless they have a tendency to thickening and tar formation when exposed to the action of oxidizing media for a prolonged period of time. Silicon oils are especially open to the attack of free halogen, for example chlorine, at temperatures as they arise in an operating pump.

Chlorinated hydrocarbons are the most stable actuating fluids in many respects and yet they do slowly split off hydrogen chloride, especially when traces of heavy metals happen to come into the actuating fluid whereby the splitting off of hydrogen chloride is even promoted, so that they cannot be used in pumps subjected to heavy continuous stress.

Now I have found that aliphatic fluoro-chloro-carbon compounds which are free from hydrogen in their molecule can be used with special advantage as actuating fluid for vacuum pumps. They are superior as regards the combination of thermal with chemical stability to esters, hydrocarbons, silicon oils and chlorinated hydrocarbons. Pumps made from corrosionproof material, for example quartz, which according to this invention are operated with fluoro-chloro-carbon compounds can be used without further protective equipment being necessary for pumping off strongly aggressive gases or vapors, for example ozone-containing oxygen, free chlorine or bromine, hydrogen chloride or nitric oxides. The actuating fluids used in accordance with this invention remain practically unattacked when exposed to the aforesaid substances.

Fluoro-chloro-carbon oils of the general formula $$X—(CF_2—CFCl)_n—Y$$

wherein X and Y represent a halogen atom, preferably a chlorine or fluorine atom, or a trihalogen methyl group, preferably $CF_3$, $CF_2Cl$ or $CCl_2F$, and $n$ is a whole number of 3 to 15, advantageously 5 to 10 or mixtures of these oils, can be used with special advantage as actuating fluid for steam ejectors and diffusion pumps.

Fluoro-chloro-carbon oils can be produced, inter alia, by cracking polymers of trifluorochloroethylene, for example as described in German Patent 1,003,700 or U.S. Patent 2,854,490. It is especially advantageous to produce the fluoro-chloro-carbon oils by telomerization of monomers containing fluorine and chlorine, for example, as described in U.S. Patent 2,770,659.

The accompanying drawing illustrates a conventional pump in which the actuating liquid described herein can be used. Fluoro-chloro-carbon actuating liquid 1 is heated to its boiling point in bulb 3 by heating means 2. The vapors travel through insulated tube 4 and are condensed in condenser 5. Connecting means 6 and 7 are respectively connected to a vacuum source and a system to be evacuated.

Example 120 milliliters of fluorochloro-carbon oil (boiling range: 150–210° C. under a pressure of 2 mm. of mercury) prepared as described in Example 2 of U.S. Patent 2,770,659 were heated at 180° C., ozonized oxygen containing 2% of ozone was passed through at that temperature for 30 minutes at a rate of 10 liters/hour, and then chlorine at the same rate for another 30 minutes at the same temperature. The whole was then scavenged with air until the odor of free chlorine had disappeared. The oil so treated was then filled into a commercial steam ejector. The ejector showed its standard suction capacity. An oil, as commonly used, was useless as actuating fluid in pumps after it had been treated as described above.

I claim:

1. The method for removing a gas from an enclosed space containing the same, which method comprises entraining said gas in a stream of an actuating fluid in a vacuum pump, said fluid having the formula $$X—(CF_2—CFCl)_n—Y$$

where X and Y are members selected from the group consisting essentially of F, Cl, $CF_3$, $CF_2Cl$, and $CFCl_2$, and $n$ is an integer within the range of 3 to 15.

2. In the method for removing a gas from an enclosed space containing the same by entraining the gas in a stream of an actuating fluid in a vacuum pump, the improvement which comprises entraining said gas in a gaseous stream of a fluid having the formula $$X—(CF_2—CFCl)_n—Y$$

where X and Y are members selected from the group consisting essentially of F, Cl, $CF_3$, $CF_2Cl$, and $CFCl_2$, and $n$ is an integer within the range of 3 to 15.

References Cited in the file of this patent

UNITED STATES PATENTS 2,770,659 Barnhart _____ Nov. 13, 1956
2,788,375 Ehrenfeld _____ Apr. 9, 1957